United States Patent [19]

Henriques

[11] 4,297,701
[45] Oct. 27, 1981

[54] RANGEFINDER USING EXPANDED TIME DELAY

[75] Inventor: Lance Henriques, New York, N.Y.

[73] Assignee: John D. Angleman, Brookside, N.J.

[21] Appl. No.: 64,390

[22] Filed: Aug. 8, 1979

[51] Int. Cl.³ .............................................. G01S 13/78
[52] U.S. Cl. ................................................ 343/6.5 LC
[58] Field of Search ............ 343/6.5 R, 6.5 LC, 6.8 R

[56] References Cited

U.S. PATENT DOCUMENTS

| | | | |
|---|---|---|---|
| 3,144,645 | 8/1964 | McIver et al. | 343/6.5 R X |
| 3,474,460 | 10/1969 | Huebscher | 343/6.8 R X |
| 3,573,819 | 4/1971 | Mason et al. | 343/6.5 R |
| 3,919,708 | 11/1975 | Pudsey | 343/6.5 R |
| 4,005,418 | 1/1977 | Gorwara | 343/6.8 R |
| 4,107,676 | 8/1978 | Lassiter | 343/6.5 R |
| 4,114,151 | 9/1978 | Denne et al. | 343/6.5 R X |

*Primary Examiner*—T. H. Tubbesing
*Attorney, Agent, or Firm*—Sherman and Shalloway

[57] ABSTRACT

The system is comprised of a plurality of hand held units carried by golfers, a plurality of flagstick units located at a golf course and a master Clubhouse unit. Each hand held unit includes a power source, a transceiver, a distance determining circuit, a keyboard with display, an audio generator and a microprocessor which controls the mode of the hand held unit. Each flagstick unit is comprised of a power source, a transceiver and a controlling microprocessor. The microprocessor includes a plurality of subprograms which control the function of the hand held unit or the flagstick unit. To determine the distance between a hand held unit and a flagstick unit, a button on the keyboard is pressed to select a particular flagstick unit. The microprocessor is activated to activate the audio generator indicating the button was properly pressed and, simultaneously, the distance determining circuit and transceiver are activated. The distance determining circuit is actually a timing circuit which measures the amount of time required for the signal from the transceiver to reach the selected flagstick unit and be retransmitted by the flagstick unit back to the particular hand held unit. The distance determining circuit is actually a capacitor which is linearly charged during transmission time and discharged at a slower rate to determine the amount of charge which is directly proportional to the distance between the hand held unit and the flatstick unit. The hand held units are also provided with a magnetic charging circuit so that the unit can be charged without the use of connections and so that the unit can be embodied in a sealed apparatus.

7 Claims, 8 Drawing Figures

RANGEFINDER USING EXPANDED TIME DELAY

BACKGROUND OF THE INVENTION

1. Field of the Invention

The invention generally relates to rangefinding systems and, particularly, to a system which may be employed on a golf course. A hand held unit carried by a golfer can be used to determine the distance between the hand held unit and a pre-selected point where a complimentary unit is located.

2. Description of the Prior Art

Many types of rangefinding systems are known in the prior art. For example, U.S. Pat. No. 3,810,179 discloses a dual receiver-transmitter system which employs two send-back units in order to derive x-y position information. This system, as well a many of the other prior art systems, is based on a radar or beamed-point-source-scanning in a specific direction to derive much of its information. Also, averaging of the information and signals is necessary to derive reliability.

U.S. Pat. No. 3,780,370 is concerned with a similar type system which uses a phase of a single cycle to determine linear measurement. However, a single cycle is subject to Doppler shift which produces erratic readings. This system also requires ultrastable reference points and can easily go out of range (jump cycles).

On the other hand, U.S. Pat. No. 4,128,835 suggests the use of a repetitive chain of continuous codes to provide a pulse coding system which can determine the range between two points. However, this system requires continuous use of a radio channel and a constant demand of a large amount of power.

U.S. Pat. No. 2,517,540 is typical of a radar type unit which requires directional signals which are reflected. U.S. Pat. No. 3,618,089 also discloses a radar type system which uses ramp voltages for averaging.

As with other phase systems, U.S. Pat. No. 2,528,119 relates to an FM system of continuous transmission. The fraction of a single cycle within a group is measured to determine the range. In order to perform the rangefinding operation, a long sampling period is required in order to lock-up the system. Such a recovery system will, by necessity, be drift prone as there is too little information in a single cycle to establish a stable reference. In addition, this single fractional measurement is very susceptible to Doppler shift so that a large number of samplings must be averaged in order to minimize time compression or expansion of a single cycle.

SUMMARY OF THE INVENTION

The rangefinder system according to the invention will include a plurality of portable hand held units which can be carried around by golfers on a golf course or as part of a golf cart, eighteen stationary flagstick units located at the eighteen holes of the golf course and a master unit located at the Clubhouse as well as fixed points of the golf course. Each hand held unit includes a receiver and a transmitter which employ an amplitude modulated signal. A frequency modulated signal may be employed in alternative embodiments. The signal emitted by the hand held units includes at least twenty active channels or code words within the signal, eighteen of the code words for identifying eighteen flagstick units and other code words for other functions such as emergency signalling, Clubhouse signalling etc. Each location, such as the flagsticks of the holes of the golf course, also includes a receiver and a transmitter. When the signal is generated by the hand held unit, all the receivers of the flagstick locations pick-up the signal and analyze the information provided on the signal. If the signal is directed to querying a particular flagstick unit, a signal is returned by the particular flagstick unit after a slight delay time. Generally, the portable hand held units and the flagstick units are very similar in that both devices employ transceivers under the control of a microprocessor.

Regarding the signal, the hand held unit first sends out an identification code. The identification code is calling on a particular flagstick unit since all units are receiving the code. The hand held unit includes a keyboard identifying the eighteen holes and any other functions, such as Clubhouse notification, emergency signalling, requests for assistance or service, authorization to play, etc. The particular unit which is identified by the code then responds to the signal. The flagstick unit called on actually receives a coded bit which is a starting bit of information. This information is analyzed by the microprocessor of the flagstick unit and delayed a specific length of time, which is adjustable to make up for variations in each individual unit and it is then retransmitted in code on the identical frequency back to the hand held unit and the master Clubhouse unit. Obviously, the retransmitted signal is also received by all other hand held units which might be on during the transmission which occurs for a microsecond but is not processed. The flagstick units are also programmed to send an identification code bit after the transmitted signal so that the master Clubhouse unit receiving this identification signal may analyze the signal for determining the location of paticular golfers or other information.

Each unit is a transceiver wherein the final stage of the transmitter is the first stage of the receiver as well. The transceiver is switched over from the microprocessor. This permits the transmission of a burst of a very strong signal without the need of a heat sink. It also permits the use of smaller components of greater power capacity without significantly effecting their battery life of each of the hand held units. In the preferred embodiment the flagstick units are solar powered rechargeable units. However, it is contemplated that the flagstick units may be battery powered or directly connected to a continuous alternating current power source.

One feature of the invention which distinguished it over prior art rangefinder systems is that the retransmitted signal from the flagstick units or the master unit is the same frequency as the original signal. In fact, the signals are identical in amplitude, code format and frequency. The only difference in the signals is that they are not related in time and use different code combinations. Because the signals transmitted have a period of transmission of the order of one microsecond, it is highly unlikely that two simultaneous signals will be transmitted. In the preferred embodiment, the burst of the signal is forty nanoseconds and in the highly unlikely case where two signals are overlapping, a garbled signal will result and retransmission would be required.

The microprocessor of each unit includes a master-programmed memory and the memory has capabilities of coding and decoding the signals. The memory also has the capability of identifying itself and carries the pole number. However, there is no processing capability in the permanent memory.

The distance is determined in a way similar to a dual-slope integrated digital voltmeter. A capacitor is charged during the period that a signal is sent from the portable hand held unit, received by the flagstick unit, retransmitted by the flagstick unit and received by the portable hand held unit. The capacitor is then discharged at a much slower rate so that the microprocessor can determine the extent of charge which has been applied to the capacitor. Since the extent of the charge applied to the capacitor is directly proportional to the amount of time that the capacitor is charged and therefore corresponds to the amount of time required to send and retransmit a signal, the distance between the hand held unit and the flagstick unit which is queried can be determined. The delay time which occurs from the time that the flagstick unit receives the signal and retransmits the signal is eliminated by the microprocessor when the time of discharge of the capacitor is measured. Clearly, the capacitor may have very low leakage characteristics and be of high quality.

In fact, the capacitor is charged by a series of discrete pulses which are applied to it. The amplitude of the charge on the capacitor is equal to the number of pulses that it receives in a given period of time. The capacitor is actually charged in a linear manner with a constant current so that a linear curve results. The number of pluses which are applied to the capacitor must never reach a point where the capacitor is saturated.

In order to discharge the capacitor at a much slower rate, a resistor is electronically connected into the discharging circuit by the microprocessor. The valve of the resistor is calculated to discharge the capacitor at a much slower rate and in order to permit the microprocessor to function as a counter. A threshold detector is used to determine when the voltage of the capacitor reaches a given low point. As the capacitor begins to discharge, the display of the hand held unit is turned on and begins to count upward at a given known rate which is directly related to the discharge rate of the capacitor. When the capacitor reaches an extremely low point and the threshold detector is activated, the display stops counting and the displayed amount is the distance of the portable hand held unit from the queried flagstick.

It is contemplated that the pulses may be counted directly if a high speed counter is involved in the system. However, such high speed counters are usually not cost effective for the inexpensive type of golfing rangefinder due to high power requirements. Preferably, the switching arrangements of the system are accomplished electronically without the use of pin diodes, vacuum read switches or other high cost items. With regard to timing, the transmitter section is much too fast for the microprocessor. Therefore, the transmitter has to be a separate module because the microprocessor cannot transmit at the same high speed. The system may be hybrid in that chips of transistors and integrated circuits are acting as a receiver and transmitter and a crystal oscillator would form the basic reference frequency of the system. There is no need for IF transformers since the one crystal oscillator in each unit will drive and derive all the frequencies. In particular, the microprocessor clock is driven from the crystal, tones are generated from the crystal and count-downs and count-ups are performed at a rate proportional to the frequency of the crystal oscillator. The result in very high accuracy for an inexpensive system.

As the system does not operate at microwave frequencies, there is no need for a directional antenna. The hand held units will carry a passive antenna which, in the preferred embodiment is a printed strip of metal.

It is therefore an object of this invention to provide a golfing device which will help golfers determine the length of their drives and will aid them in determining their distance from a given point so that the proper golf clubs may be selected.

It is another object of this invention to provide a golfing device which will employ the use of a hand held unit with a digital display of distance from the hole the golfer is playing.

It is another object of this invention to provide a golfing device which will employ the use of a transceiver at each flagstick which will be in communication with the hand held units by digital code.

It is another object of this invention to describe a rangefinding system which includes a distance determining circuit to measure the amount of time required for a signal to be transmitted from a hand held unit and to be retransmitted from a flagstick unit back to the hand held unit.

BRIEF DESCRIPTION OF THE DRAWINGS

These features and objects of the invention as well as others will become apparent to those skilled in the art by referring to the accompanying drawings in which.

DETAILED DESCRIPTION OF THE INVENTION

Figure 1:
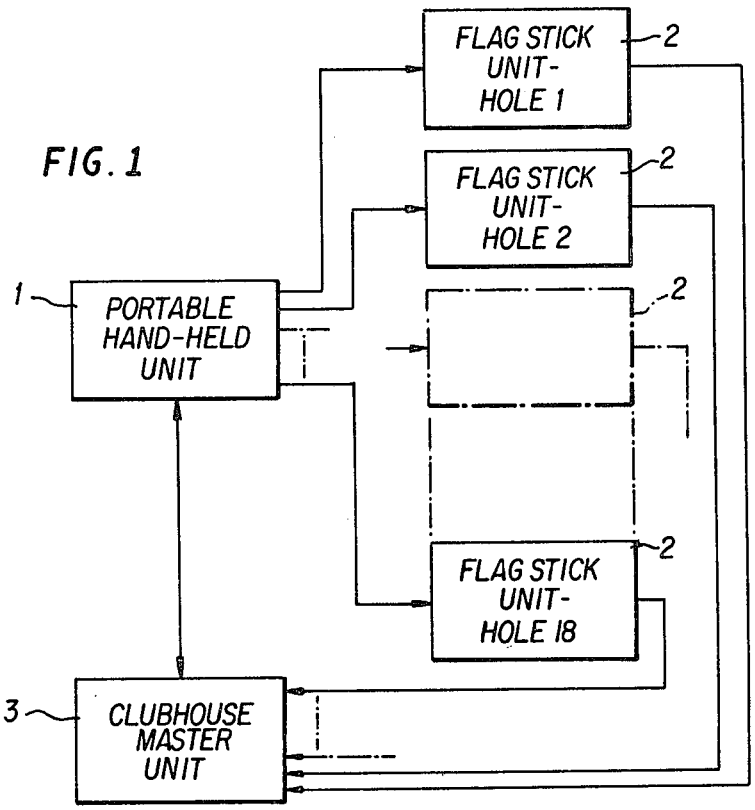
FIG. 1 is a simplified block diagram of the system according to the invention as applied to a golf course.

FIG. 1 is a simplified diagram of the system as applied to a rangefinder for a golf course. In general the system will include a plurality of portable hand held units 1 which are carried by golfers located on the golf course. Located adjacent to each green on the golf course or on the flagstick would be a flagstick unit 2. FIG. 1 shows that eighteen flagstick units 2 are contemplated, one flagstick unit for each hole. However, it is also contemplated that additional units may be located at convenient points, such as at restrooms, midway points on the longer holes of the golf course or on dog legs, hazards, traps or water traps.

Figure 2:
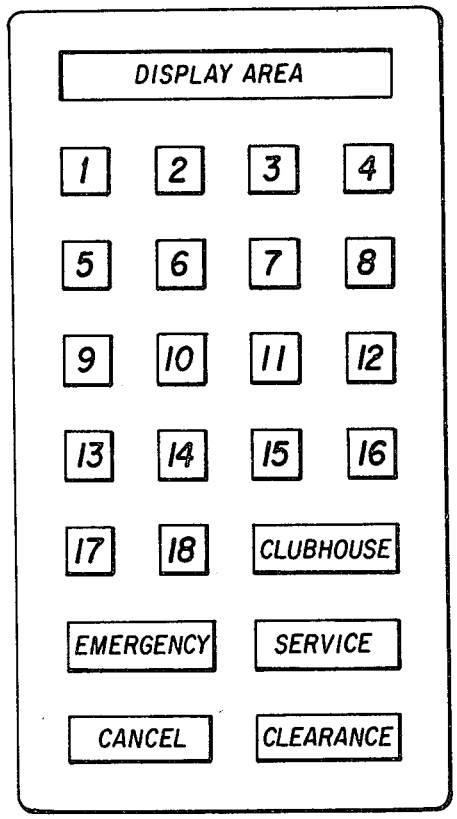
FIG. 2 is a plan view of a hand held unit according to the invention illustrating the display area and keyboard of the hand held unit.

Each portable hand held unit 1 would include a keyboard display as illustrated in FIG. 2. The top of the keyboard display would have a display area which would actually show the information desired by the golfer. At least eighteen buttons would be located on the display, one button for each hole. Additional buttons for the Clubhouse, emergency signalling, requests for service, cancelling of emergency signalling or requests for service or clearance to tee off could also be included on the keyboard. If flagstick units are located at points other than the eighteen holes, additional buttons would also be provided on the keyboard to correspond to these additional flagstick units. A golfer carrying a portable hand held unit and located on a golf course would use the hand held unit to determine his location as compared to a flagstick unit. For example, if a golfer carrying a hand held unit were located on the tee of the sixth hole or waiting near the sixth hole, the golfer would press the button labeled "6" on the keyboard and the display of the keyboard would show the distance of the golfer from the sixth hole.

Figure 3:
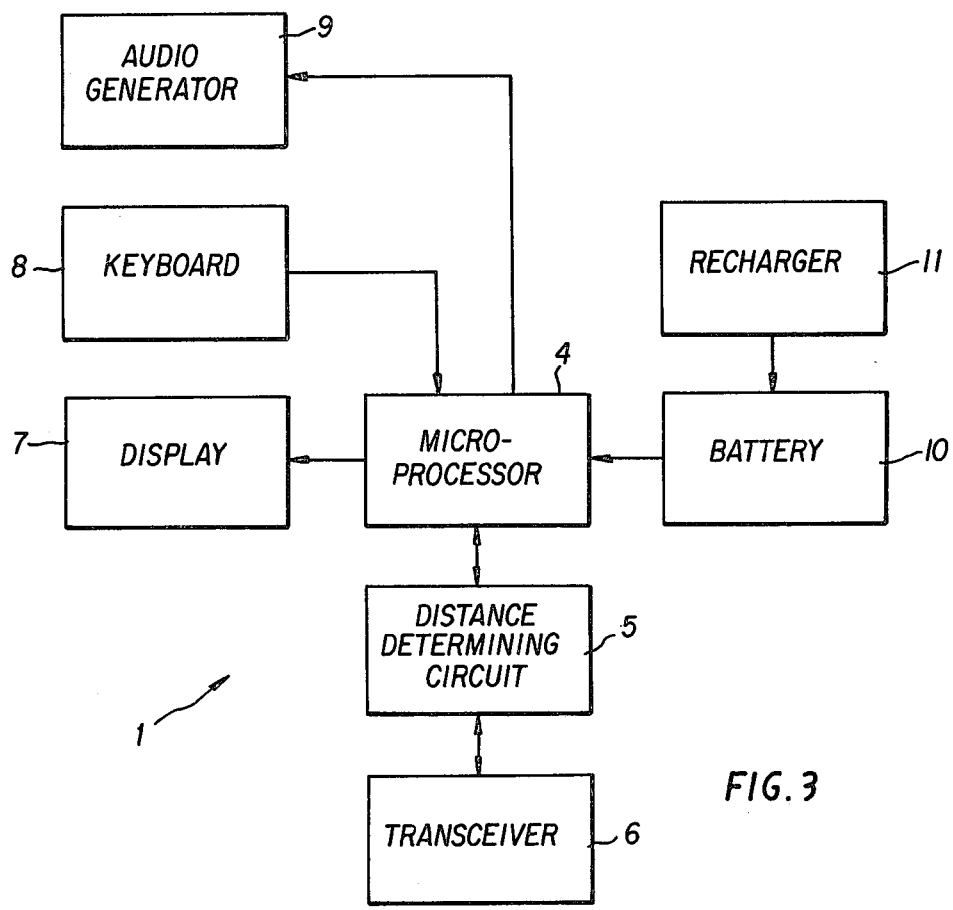
FIG. 3 is a block diagram of the hand held unit according to the invention.
Figure 4:
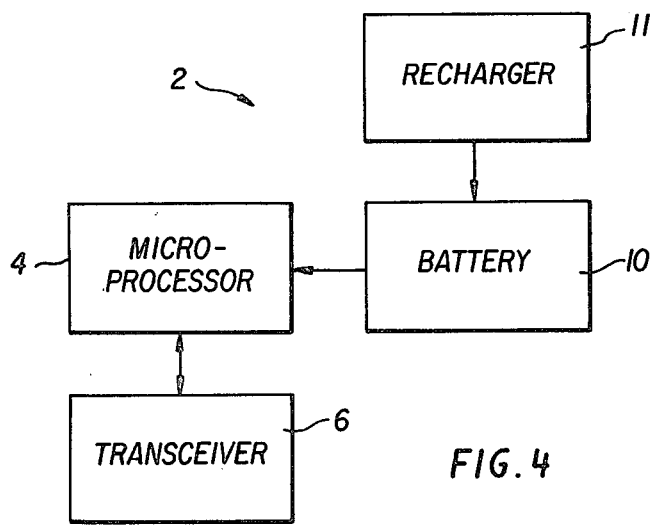
FIG. 4 is a block diagram of the flagstick unit according to the invention.

FIG. 3 is a block diagram of the functional aspects of the hand held unit. FIG. 4 is a block diagram of the functional aspects of the flagstick unit. The basic component of each unit is the microprocessor 4 which controls the functions of the unit and mode of transceiver 6. The combination of the microprocessor 4 and tranceiver 6 are powered by battery 10 which is rechargeable by recharger 11. In the preferred embodiment, the hand held unit 1 employs a magnetic recharger and the flagstick unit 2 employs a solar recharger. However, it is contemplated that the hand held unit 1 may be recharged by solar means or that no recharger at all may be used. It is also contemplated that the flagstick unit 2 can employ a magnetic recharger or a continuous power source such as a low voltage (under 33 volts) alternating current source.

The microprocessor 4 is a mask-programmed integrated circuit that controls all phases of operation by a program stored in the memory. The program is defined by a plurality of subprograms which are available by input coding. The particular mode of the unit is determined by the subprograms.

The transceiver 6 is an electronically switched receivertransmitter under the operational control of the microprocessor 4. In the case of the hand held unit, the transceiver is maintained in the receive mode except during transmission. Similarly, the transceiver 6 of the flagstick unit 2 is maintained in the receiver mode except during the period of time immediately after receiving a signal when it is maintained in the transmitting mode.

The distance determining circuit 5 is used only in the hand held unit 1 and forms the high speed logic for determining the amount of time necessary to transmit a signal to a given flagstick unit 2 and to receive a retransmitted signal from the flagstick unit 2.

The audio generator 9 is a sounding circuit in the form of an electronic noisemaker that verifys keyboard entry and can be used as an emergency locating aid. The display and keyboard 8 of the hand held unit 1 are of the type used on electronic calculators. The display 7 may be a 3,4 or 5-digit LED, 7-segment display that will display the distance from a queried unit. The display is controlled by the microprocessor 4 and displays the distance in any convenient distance unit for a period of ten seconds.

Figure 5:
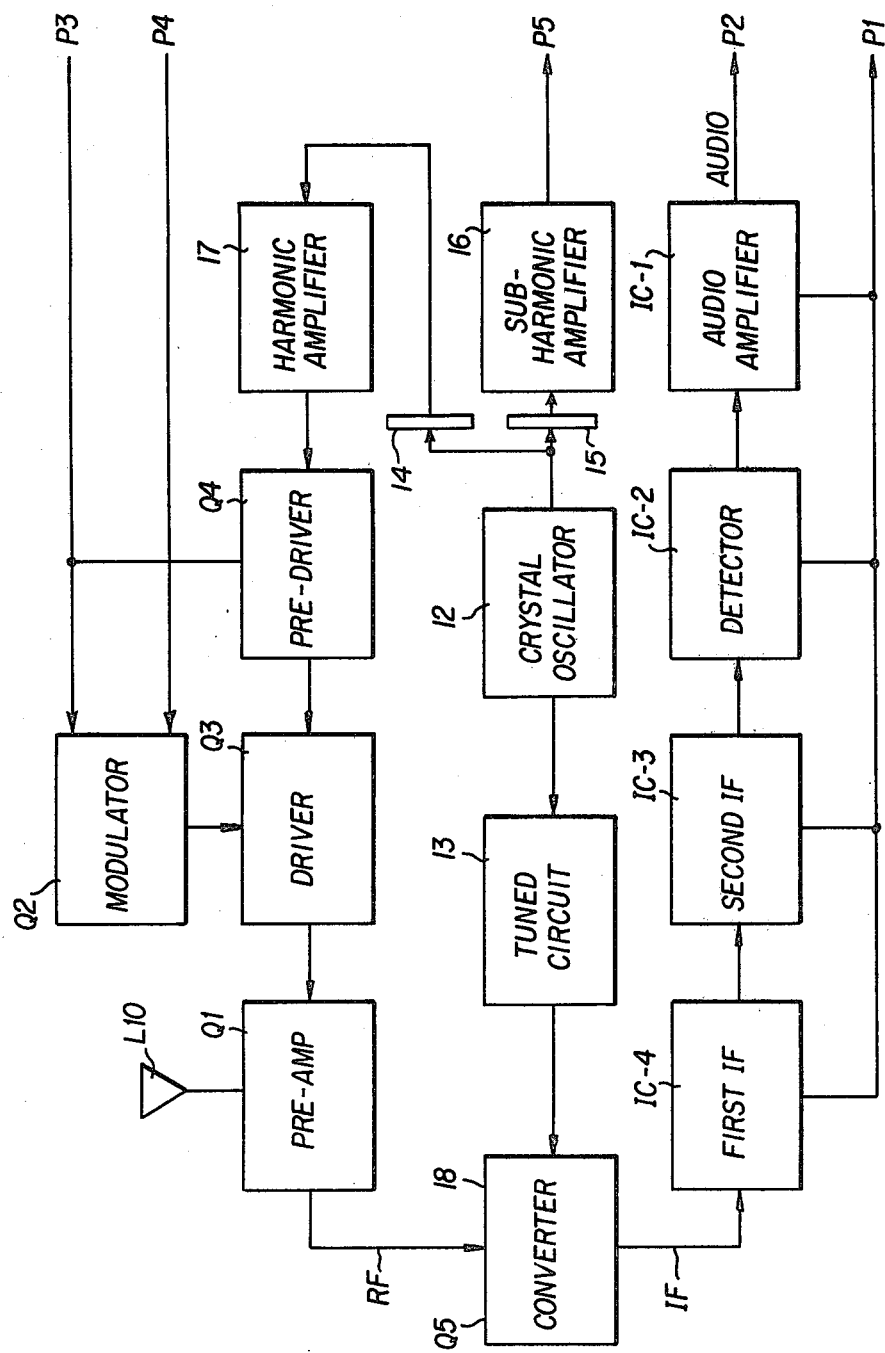
FIG. 5 is a block diagram of the transceiver employed in the invention.
Figure 6:
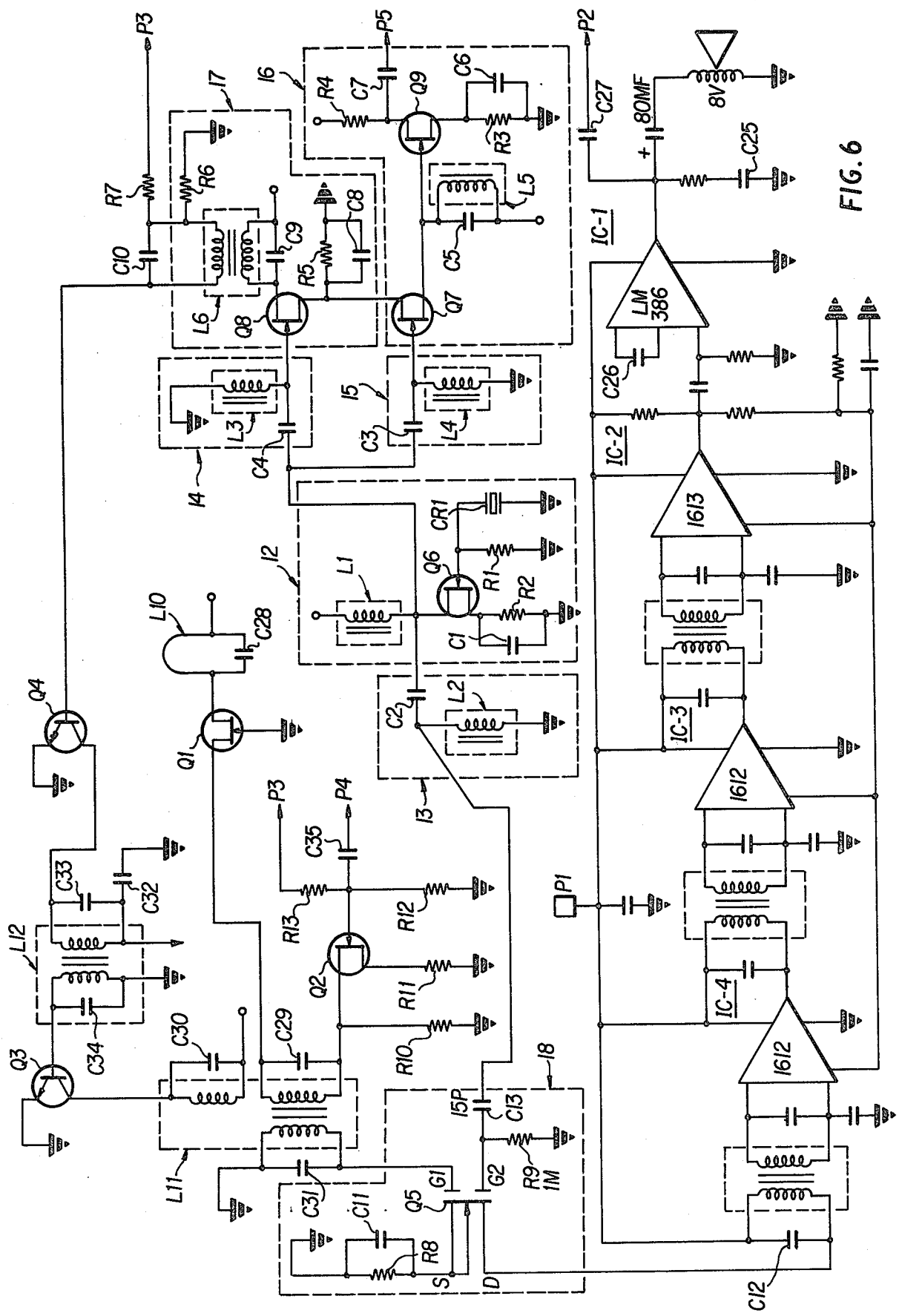
FIG. 6 is a circuit diagram of the transceiver of FIG. 5.

FIG. 5 is a functional block diagram of the transceiver 6. As shown in FIG. 5, the circuit is described using tuned circuits and multi-integrated circuits. It is contemplated that the functional aspects of the transceiver circuit illustrated in FIG. 5 can be miniaturized into a passive hybrid circuit. FIG. 6 is a circuit diagram of the functional block diagram of FIG. 5.

The basic reference frequency comes from the crystal oscillator 12 which is comprised of components L1, Q6, CR1, R1, R2 and C1. Component CR1, is an overtone crystal. The support oscillator for the overtone crystal CR1 is an untoned type oscillator operating at the crystal fundamental frequency. The output of transistor Q6 provides a complete range of harmonics all related to and stable with respect to the basic crystal CR1. Three tuned circuits 13, 14 and 15 select the particular harmonics from the crystal oscillator 12 which are to be used for the different portions of the tranceiver. Tuned circuit 15 including components L4 and C3 selects the sub-harmonic that is later used by the microprocessor as a clock pulse and reference frequency. The microprocessor clock signal P5 is provided by a sub-harmonic amplifier 16 including components Q9, R3, C6, R4, C7, L5 and Q7.

Tuned circuit 14 is comprised of components L3 and C4 and picks off the transmitter carrier for the harmonic amplifier 17. The components which comprise the harmonic amplifier 17 include Q8, C9, L6, R6, R5 and C8. The output of harmonic amplifier 17 is applied across capacitor C10.

Tuned circuit 13 is comprised of components L2 and C2 and selects the harmonic frequency which is used for converter 18, the frequency being 45 MHz lower than the transmitter frequency. Therefore, all the oscillator pick-offs are locked into the basic crystal CR1.

Transistor Q5 is a dual gate MOS FET which forms the basis of the converter 18 and is used as a heterodyne converter. Transistor Q5 receives two signals, one from the amplified version of the transmitter frequency which originates from the transmitter on the flagstick units 2 and another signal in the form of a 45 MHz reference signal from tuned circuit 13. These two signals are mixed by transistor Q5 and the drain D of Q5 provides an output which contains several component signals from this mixing action. The primary coil of transformer component L7 in combination with capacitor C12 passes only the converted IF frequency of interest. Components R8 and C11 are used to bias transistor Q5 of the converter 18 and components C13 and R9 are oscillator coupling and gate leak components, respectively, of the convertor 18. The power to operate transistor Q5 is "on" only during the receive mode of the transceiver. Transistor Q3 is a class "C" driver that couples the transmitter carrier through inductance L11. Q3 receives the transmitter carrier through transistor Q4. Transistor Q4 is a pre-driver that is said to be biased class "A-B" because transistor Q4 provides an output signal only when P3 is positive, indicating the transmit mode. The class "C" amplifier will only use power when driven by a suitable signal from transistor Q4 so that the transmitter is effectively off by controlling P3. P3 biases Q4 "on" through resistor R7. Q7 receives its signal from harmonic amplifier 17 as applied across capacitor C10. In the receive mode transistor Q1 of the pre-amplifier gets its power through resistor R10. Resistor R10 in combination with the flow-through transistor Q2 are used in the transmit mode for "high power". This is also controlled by the status of P3 which biases Q2 through resistor R13. Capacitor C35 is used to control the modulation of the transmitter by varying the total power to transistor Q1 via transistor Q2. Modulation is from the microprocessor and is in a pulse format injected at P4. R11 and P12 are used to bias Q1.

The IF frequency is further tuned for amplification by IC4 and IC3 which are tuned IF amplifier stages. Inductance L9 feeds the tuned frequency to IC2 which is an active detector and an automatic gain control generator. Its output is the modulation sent by the flagstick unit 2 and contains the pulse code signal. Component IC1 amplifies this for use by the microprocessor and a small speaker 8 V is used to monitor this only in the first unit.

Compensation components C25 and C26 are used to compensate the pulse modulation. Capacitor C27 feeds this compensated signal to P2 for the microprocessor. All the integrated circuits IC-1–IC-4 are only on in the receive mode which is therefore controlled by the microprocessor at P1 and P3. Component L10 designates a printed circuit antenna and capacitor C28 tunes the antenna to the transmitter frequency. Transistor Q1 is a common gate amplifier and is used as an RF amplifier in the receive mode and as a final power amplifier in the transmit mode.

Figures 7, 8:
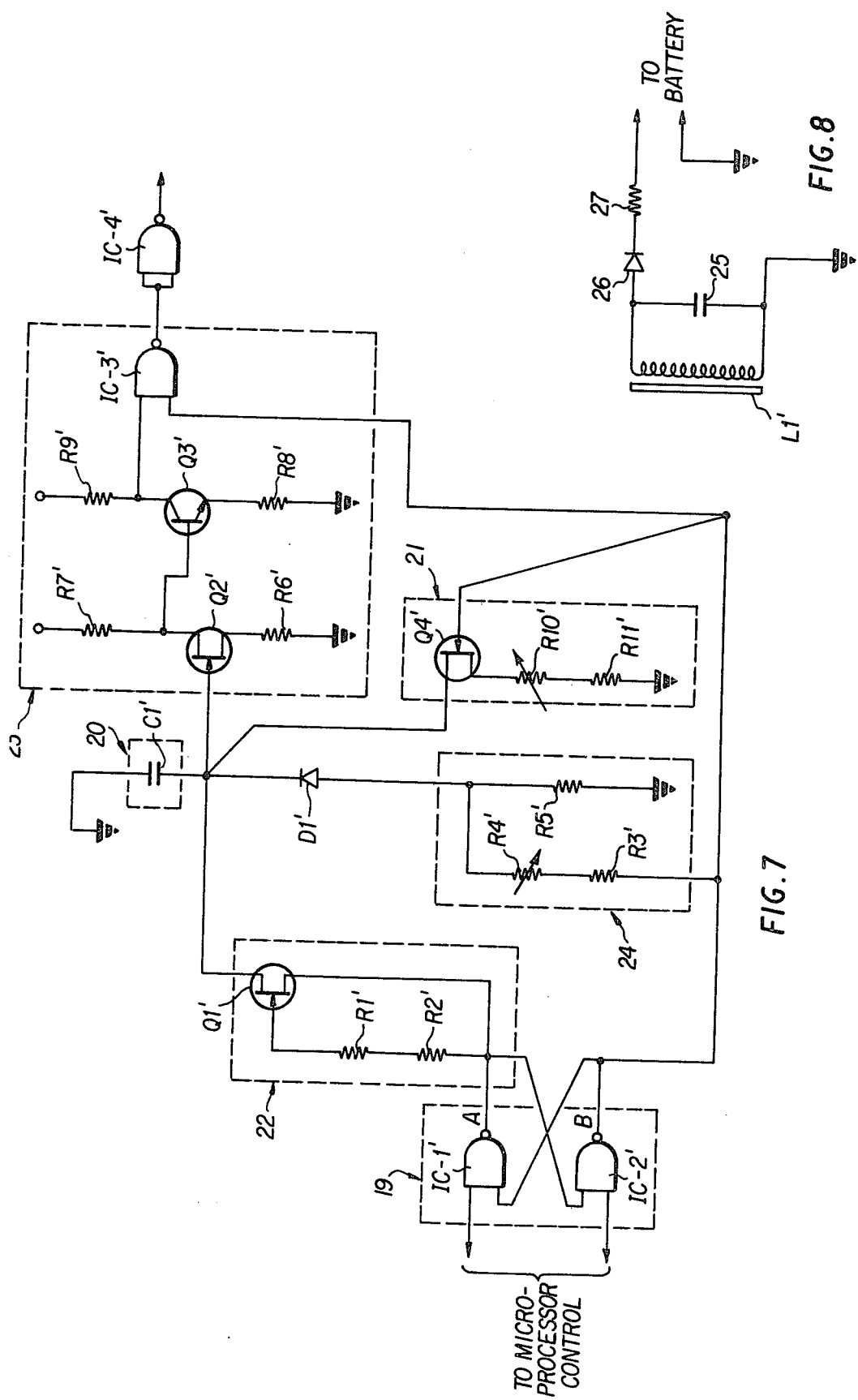
FIG. 7 is a circuit diagram of the distance determining circuit according to the invention.
FIG. 8 is a circuit diagram of the magnetic charger according to the invention.

FIG. 7 is a circuit diagram of the distance determining circuit 5 employed in the portable hand held unit 1. Components IC1', IC2', IC3' and IC4' form a single input quad dual input NAND gate. Components IC1' and IC2' are a flip-flop 19 that is set by the microprocessor so that flip-flop 19 forms a switch that decides if the circuit is measuring or decoding already measured time. Points A and B are alternatively logically high or low.

When point A is high the circuit is measuring time. When the microprocessor controls flip-flop 19 such that point A is logically high, current flows through transistor Q1'. The amount of current is controlled and set by resistors R1' and R2'. This current is a constant value which charges the distance measuring capacitor C1', which forms integrator 20. Distance measuring capacitor C1' is charged at a linear rate and the accumulated charge on capacitor C1' is a function of the time during which point A remains logically high which is related to the time-distance between a hand held unit 1 and a flagstick unit 2. It is important to note that transistor Q1' is only capable of charging capacitor C1'. During this charge-up time, component IC3' is gated off when the microprocessor switches point B logically high. The result is that point A goes logically low stopping the charging of the distance measuring capacitor 20. Variable resistance R1' is used to calibrate the current as point B goes logically high. When point B is logically high, transistor Q4' is on which discharges the distance measuring capacitor C1' through resistors R10' and R11'. Therefore, transistor Q4', variable resistor R10', and resistor R11' form the discharging circuit 21. During discharge, component IC3' has an input which is now gated "on" as long as the charge remaining on capacitor C1' remains above a critical value. The threshold value of capacitor C1' which gates the input of component IC3' into the "off" position is monitored and converted into a logic level by transistors Q2' and Q3' in timing output circuit 23. Component IC4' is used to correct this level to a positive true level and to improve the response time. The output of component IC4' is provided to the microprocessor and controls the counter of the microprocessor that holds and displays the distance value. Variable resistor R10' is used to calibrate the distance into appropriate units. Therefore, timing output 23 is comprised of transistor Q2', resistors Q6' and Q7', transistor Q3', resistors Rb', R7', R8' and R9' and component IC3'.

Biasing diode D1' is employed to insure that a precharge value is continually placed on capacitor C1'. Biasing diode D1' prevents capacitor C1' from discharging below the voltage that is set by divider 24 comprised of resistors R3', R4' and R5'. The minimum charge placed on capacitor C1' by the divider 24 through biasing diode D1' is used to shape the charging range of C1', locate the charging range of C1' within a linear portion of its charging band and calibrate the value of capacitor C1' in combination with the pinch-off parameter of transistor Q2'.

FIG. 8 is an illustration of the magnetic charger circuit which forms a part of the hand held unit 1 in the preferred embodiment. Inductance coil L1' is wound on a ferrite core and is connected across capacitor 25 to form a tuned circuit. Conveniently located at the Clubhouse is a charger case which would have a chamber which would accommodate all the hand held units 1 of a given system located at a golf course. The entire case is encircled by a radiating coil with an electronic circuit to drive the coil. A power transformer converts line voltage to a low voltage for this purpose. A hand held unit equipped with the circuit illustrated in FIG. 8 is placed within the case. The radiating coil within the case generates a 100,000 Hz signal which is necessarily applied to inductance L1' and converted to an alternating current voltage due to the tuned nature of the inductance coil L1' in combination with the capacitor 25. A rectifier or diode 26 is provided to convert the alternating current voltage into a direct current voltage which can be applied to the battery within the hand held unit to recharge the battery. Resistor 27 is used to limit the charging current applied to the battery. This system allows the units to be configured in a totally sealed system which is waterproof and shock resistant. Charging of the hand held units 1 is a simple matter of inserting the hand held units into the case and activating the coil within the case. No plugs, wires or other connections are required to charge the hand held units.

MODE OF OPERATION OF THE INVENTION

In summary, the system operates as follows. The keyboard of a hand held unit 1 is activated by selecting a given hole number or a particular signal such as a Clubhouse signal or request appearing on the keyboard. Activation of the keyboard results in the microprocessor selecting a subprogram which activates the transceiver 6 into the transmit mode. A signal is then transmitted carrying data bits which define the flagstick unit 2 from which the distance to the unit is to be determined. All flagstick units 2 receive the signal but only the particular unit queried is activated by the signal. The microprocessor 4 of the flagstick unit activates its transceiver from the receive mode to the transmit mode to return, after a time delay, a signal to the hand held unit 1. The hand held unit 1 with its receiver now in the receive mode receives the signal from the flagstick unit. When the hand held unit 1 initially transmits the questioning signal, charging circuit 22 of the distance measuring circuit 5 is activated by the microprocessor logic and distance measuring capacitor 20 is linearly charged during the period of time from when the signal leaves the hand held unit 1 until the retransmitted signal from the flagstick unit 2 is returned to the hand held unit 1. When the signal is again received by the hand held unit from the the flagstick unit, the microprocessor logic disconnects the charging circuit 22 and connects the discharging circuit 21. Simultaneously, the microprocessor logic activates a counter which counts for the amount of time during which the distance measuring capacitor 20 is discharged to a given threshold. When the distance measuring capacitor 20 reaches the threshold, timing output circuit 23 stops the counter and the display is activated showing the total count on the display 7. Since the transmission speed of the signals is known and the delay time of a given unit is known, the total transmission time is directly proportional to the distance between the hand held unit and the flagstick unit. By calibrating the counter in a convenient unit measurement the display actually shows the yards, feet or meters of distance between the hand held unit and the flagstick unit which was queried.

The pulses applied to the integrating circuit 20 could be directly counted if a high speed counter were employed in the system. The distance measuring capacitor C1' is actually being charged from a pulse which is the by-product of the master crystal CR1 used in the transmitter and the tone generator, and is a 960 MHz pulse. A 960 MHz wavelength is conveniently equal to one foot. In order to eliminate the delay or transferred time within the flagstick units, the hand held units are calibrated to a standard. The standard is conveniently the low level at which the main counter stops counting. This provides a standard transfer delay time. In effect, the hand held unit begins its distance measurement when there is the same amount of time left in the integrating circuit 20 as the delay time.

Regarding the transmission signals, a 246 MHz sine wave carrier is detected as a discrete step wave. The exact shape of the pulse is not important because it is digitally used. This allows the pulse to have spikes or carry noise without effecting the accuracy of the system. The last pulse allows a "window to open" so that the pulse can come through. In fact, the system resembles a video-receiver system that is not sensitive to amplitude distortion or phrase. The composite code is specified as a first start bit which does not go out as an actual code, a first identification word, a second identification word, a third identification word, a test or parody bit and an actuation bit. This type of transmitted signal is extremely reliable and even when the signal is garbled, the code does not usually drop more than one bit if any.

It is contemplated that the hand held unit would include an emergency signalling system. The circuit for emergency signalling system is the only circuit that may continuously transmit and override all other functions. The emergency channel sends out a standard code different only in the pulse count which is interpreted as an alarm condition. The system latches itself "on" for continuous transmission and also sends out an continuous audible alarm which allows an individual to be found if there is a problem. The audible alarm also verifies that the signal is properly transmitted for emergency condition and confirms that the key has been properly depressed.

Various changes may be made in the details of the invention without sacrificing the advantages thereof or departing from the scope of the appended claims. Furthermore, although the present invention has been disclosed and discussed with particular regard to its exceptional advantages in terms of a golf rangefinding system, it may be understood that the invention may be employed in several industrial applications wherein rangefinding is necessary. For example, most light planes do not have radar and a system of this type can be applied to light planes and be used by any radio system. This system would function as a distance measuring system using a standard radio. The available band should be a VHF band. Such a system would not interfere with television transmission and could be any broadcast frequency band.

In general, it is important to note that the system uses low frequency non-directional radio and not microwaves or radar or directional radar. The system also conserves battery life by employing a microprocessor which sends out bursts of signals rather than a continuous signal.

Although the hand held unit would preferably have a rechargeable battery such as a nine volt nickel cadmium battery, it is also contemplated that a hand held unit or the flagstick unit may be included with a bank of silicon cells, impervious to moisture, to recharge the battery by solar energy.

One feature of the invention which this system allows is the development of the master Clubhouse unit as a locating means for all hand held units on a given golf course. When a hand held unit is used to determine the distance of the hand held unit from a particular flagstick, the signal transmitted by the hand held unit is also transmitted to the Clubhouse master unit. The Clubhouse master unit also receives the retransmitted signal from the flagstick unit which was queried by the hand held unit. This information allows the Clubhouse master unit to determine the hole location of the hand held unit and to further determine the distance of the hand held unit from the flagstick unit which was queried. By employing a video display of the entire golf course, the location of each hand held unit could be displayed. Furthermore, the master Clubhouse unit can be provided so that it will indicate immediately when a unit is not sending out a proper signal. The master receiver is an all encompassing receiver to digest every transmission provided.

It is contemplated that all manufactured systems can be provided on the same frequency since the range of the system will be approximately one mile and the burst of transmission from each system makes it highly unlikely that another system would interfere. Ultimately, individual golfers would be able to purchase consumer type units which would be available for their private use on any golf course.

What is claimed is:

1. A system for determining the distance between a first point and a second point comprising:
   (a) first transceiver means located at the first point for transmitting a first signal burst on a given frequency and for receiving signals on the given frequency;
   (b) second transceiver means located at the second point for receiving the first signal burst on the given frequency and for retransmitting a second signal burst on the given frequency in response to the first signal burst; and
   (c) timing means for measuring the period of time between the transmission of the first signal burst by the first transceiver means and the receipt of the second signal burst by the second transceiver means, whereby the period of time is directly proportional to the distance between the first point and the second point, said timing means being comprised of an integrator including a capacitor, a means for linearly charging the capacitor at a charge rate during the period of time, a means for linearly discharging at a slower rate than said charge rate the capacitor after the period of time, a threshold detector for detecting when the state of charge of the capacitor reaches a predetermined value;

(d) and a microprocessor for measuring an amount of time that the capacitor is charged to a value of at least said predetermined value, the amount of time corresponding to said distance between the first point and the second point.

2. The system of claim 1 wherein said first transceiver means is a hand held unit comprising a radio means for transmitting the first signal burst and for receiving the second signal burst, a microprocessor for activating the timing means and the radio means, and a power source selectively connected through the microprocessor to the timing means and the radio means.

3. The system of claim 2 wherein said microprocessor analyzes the period of time by subtracting the period of delay from the time the second transceiver means receives the first signal burst to the time that the second transceiver means transmits the second signal burst and converts a signal corresponding to the resulting period of time into a signal corresponding to the distance between the first point and the second point; and wherein a display means is provided for displaying the distance between the first point and the second point as represented by the corresponding resultant signal.

4. The system of claim 3 wherein the second transceiver means is comprised of a flagstick unit including a second power source, a second radio means for receiving the first signal and transmitting the second signal and a second microprocessor for controlling the second radio means.

5. A system for determining the distance between a first point and a second point comprising:

(a) a timing means (b) first transceiver means located at the first point for transmitting a first signal burst on a given frequency and for receiving signals on the given frequency, the first transceiver means being a hand held unit comprising a radio means for transmitting the first signal burst and for receiving the second signal burst;

(c) a first microprocessor for activating the timing means, the transceiver and a power source, the power source being selectively connected through the first microprocessor to the timing means and radio means; and (d) second transceiver means located at the second point for receiving the first signal burst on the given frequency and for retransmitting a second signal burst on the given frequency in response to the first signal burst, the second transceiver means being comprised of a flagstick unit including a second power source, a second radio means for receiving the first signal and transmitting the second signal, and a second microprocessor for controlling the second transceiver;

(e) wherein the timing means provides a delay signal between the transmission of the first signal burst by the first transceiver means and the receipt of the second signal burst by the first transceiver means by linearly charging a capacitor at a charge rate, detecting when the the state of charge of the capacitor achieves a predetermined value and linearly discharging the capacitor at a slower rate than said charge rate, whereby the delay signal is directly proportional to the distance between the first point and the second point;

(f) and wherein said first microprocessor analyzes the delay signal by subtracting the period of delay from the time the second transceiver means receives the first signal burst to the time that the second transceiver means transmits the second signal burst and converts a signal corresponding to the resulting period of time into a signal corresponding to the distance between the first point and the second point as represented by the corresponding resultant signal.

6. The system of claims 4 or 5 further including a magnetic induction coil recharging means for recharging the power source of the hand held unit.

7. The system of claim 6 further including a solar recharging means for recharging the second power source of the flagstick unit.

* * * * *